(12) United States Patent
MacPherson

(10) Patent No.: US 7,636,682 B1
(45) Date of Patent: Dec. 22, 2009

(54) SYSTEM AND METHODS FOR PROCESSING OPEN-END MUTUAL FUND PURCHASE AND REDEMPTION ORDERS AT CENTRALIZED SECURITIES EXCHANGES

(76) Inventor: James MacPherson, 5 School St., Cos Cob, CT (US) 06807

( * ) Notice: Subject to any disclaimer, the term of this patent is extended or adjusted under 35 U.S.C. 154(b) by 1483 days.

(21) Appl. No.: 09/716,189

(22) Filed: Nov. 17, 2000

Related U.S. Application Data

(60) Provisional application No. 60/166,558, filed on Nov. 19, 1999.

(51) Int. Cl.
*G06Q 40/00* (2006.01)
(52) U.S. Cl. .............................. 705/37; 705/36; 705/35; 705/26
(58) Field of Classification Search .............. 705/35–38
See application file for complete search history.

(56) References Cited

U.S. PATENT DOCUMENTS

| | | | | |
|---|---|---|---|---|
| 5,517,406 A | * | 5/1996 | Harris et al. | 705/30 |
| 5,864,827 A | * | 1/1999 | Wilson | 705/35 |
| 5,949,044 A | * | 9/1999 | Walker et al. | 235/379 |
| 6,029,146 A | * | 2/2000 | Hawkins et al. | 705/35 |
| 6,148,293 A | * | 11/2000 | King | 705/35 |
| 6,236,972 B1 | * | 5/2001 | Shkedy | 705/1 |
| 6,247,000 B1 | * | 6/2001 | Hawkins et al. | 705/37 |
| 6,267,292 B1 | * | 7/2001 | Walker et al. | 235/379 |
| 6,418,419 B1 | * | 7/2002 | Nieboer et al. | 705/37 |

OTHER PUBLICATIONS

Distribution of Mutual Fund 1099s improved; more changes considered Thomas Sutter. ABA Trust & Investments. Washington: May/Jun. 1999. vol. 69 p. 40, 2 pgs.*

* cited by examiner

*Primary Examiner*—Frantzy Poinvil
*Assistant Examiner*—Clement Graham
(74) *Attorney, Agent, or Firm*—Abelman, Frayne & Schwab

(57) ABSTRACT

A system for processing mutual fund order messages, including mutual fund purchase and redemption transactions, comprising a server for receiving order messages from at least one of a plurality of designated Exchanges or brokers, aggregating the order messages, reformatting the order messages and transmitting the order messages to at least one of a plurality of Fund/Securities Clearing Agents for confirmation, clearing and settlement including issuance and redemption of mutual fund shares.

45 Claims, 13 Drawing Sheets

NAV Processing

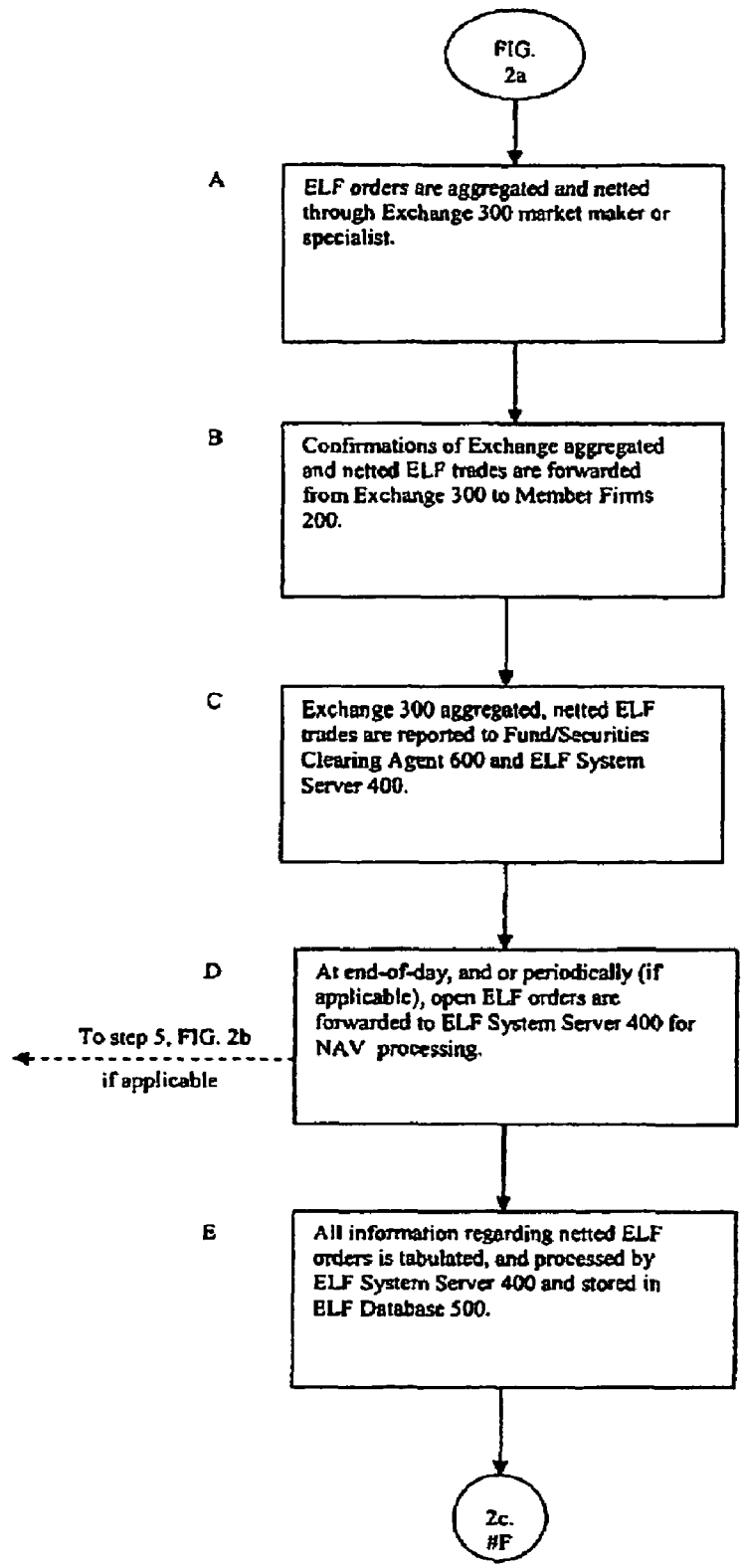

FIG. 3

*Equity Order Entry Format*

| LINE # / MAX. CHARACTERS | ENTRY | | | | | |
|---|---|---|---|---|---|---|
| 0 / 32 | SHARED INTERFACE FIRM IDENTIFIER | | | | | |
| 1 / 32 | BRANCH CODE | | | SEQUENCE NUMBER | | |
| 1A / 32 | EXCHANGE | ROUTING CODE | | COMP SPEC | | BOOTH ID |
| 2 / 32 | POSS DUPLICATE | CANCEL | | BUY    SL    SSHRT<br>BUY MINUS    SL PLUS    SSHRT EXEMPT | | |
| 3 / 74 | QUANTITY | STOCK SYM | | SUFFIX | | PRICE |
| 3A / 32 | ALL OR NONE | TIME-IN-FORCE | DO NOT REDUCE/ INCREASE | DELIVERY INSTRUCTION | TRY TO STOP | ACCOUNT TYPE |
| 3B / 32 | CXL | PRICE: FOR PRICE CHANGE ONLY | BUY    SL    SSHRT<br>BUY MINUS    SL PLUS    SSHRT EXEMPT | | | |
| 3C / 74 | QUANTITY | STOCK SYM | SUFFIX | PRICE:____<br>MKT | CLO    OB    STP<br>BAS    WOW | LMT:____ |
| 3D / 32 | ALL OR NONE | TIME-IN-FORCE | DO NOT REDUCE/ INCREASE | DELIVERY INSTRUCTION | TRY TO STOP | ACCOUNT TYPE |
| 3E / 32 | LEAVES | TIME-IN-FORCE (SAME AS LINE 3A) | | | | |
| 3F / 32 | CURRENTLY NOT USED | | | | | |
| 4 / 32 | MISCELLANEOUS INFORMATION | | | | | |
| 4A / 32 | REFERENCE DATA | | | MISCELLANEOUS INFORMATION | | |
| 4B / 74 | GIVE UP DATA | | | CONFIRMATION DATA | | |
| TRAILER LINE | | | | | | |
| | MEMBER FIRM'S CUSTOMER INFORMATION | | | | | |

FIG. 4A, Fund Order Entry Form

| Field Name | Start | End | Len | Type | Description | Opt/Req | Reject Code |
|---|---|---|---|---|---|---|---|
| Physical Sequence Number | 1 | 2 | 2 | A/N | | R | 004 |
| Logical Sequence Number | 3 | 4 | 2 | A/N | 01 | R | 004 |
| Originator Type | 5 | 5 | 1 | A/N | B = Firm<br>T = TPA | R | 187 |
| Filler | 6 | 7 | 2 | A/N | Space | R | |
| Firm Number | 8 | 11 | 4 | N | | R | 008 |
| Firm Suffix | 12 | 14 | 3 | A/N | See Fund/SERV manual | O | 154 |
| Record Type | 15 | 17 | 3 | A/N | 001 = Order | R | 002 |
| Test Indicator | 18 | 18 | 1 | A/N | 0 = Production<br>1 = Test | R | 122 |
| Priority Indicator | 19 | 19 | 1 | A/N | 0 = Normal<br>1 = High priority | O | 151 |
| Fund Number | 20 | 23 | 4 | N | | O | 100 |
| Fund Suffix | 24 | 26 | 3 | A/N | See Fund/SERV manual | O | 155 |
| Security Issue Country Code | 27 | 28 | 2 | A/N | Space. For future use | R | |
| Security Issue ID | 29 | 37 | 9 | A/N | | R | 007 |
| Security Issue Check Digit | 38 | 38 | 1 | A/N | Space. For future use | R | |
| Security Issue Type | 39 | 40 | 2 | A/N | 24 = Money Market<br>25 = Load Fund<br>26 = No Load Fund | R | 150 |
| Control Number | 41 | 55 | 15 | A/N | | R | 005 |
| Correction Indicator | 56 | 56 | 1 | A/N | Space | R | 006 |
| Transaction Type | 57 | 57 | 1 | A/N | 0 = Single purchase<br>1 = Letter of intent<br>2 = Rights of accumulation<br>3 = Net asset value<br>4 = Group purchase | R | 017 |

FIG. 4B, Fund Order Entry Form

| | | | | | | | |
|---|---|---|---|---|---|---|---|
| Transaction Code | 58 | 59 | 2 | A/N | 5 = CDSC liquidation<br>01 = Initial purchase<br>02 = Subsequent purchase<br>03 = Partial liquidation<br>04 = Full liquidation<br>Must be 03 or 04 if Transaction Type = 5 | R | 018 |
| Submission Date (+) | 60 | 67 | 8 | N | mmddccyy | R | 101 |
| Trade Date (+) | 68 | 75 | 8 | N | mmddccyy | R | 016 |
| Book/Physical Share Indicator | 76 | 76 | 1 | A/N | 0 = Book shares - firm name<br>1 = Book shares - customer name<br>2 = Physical shares<br>3 = Both book and physical shares<br>Must be 0 or 1 for Money Market trades | R | 015 |
| PI Delivery Indicator | 77 | 77 | 1 | A/N | Required for all purchases if Book/Physical Share Ind = 2.<br>0 = Deliver to customer<br>1 = Deliver to firm<br>2 = Deliver to agent for firm | OC | 039 |
| Filler | 78 | 78 | 1 | A/N | Space | R | |
| Settlement Override Reason Code | 79 | 80 | 2 | A/N | Required if Anticipated Settlement Date is provided.<br>01 = Wrap fee account<br>02 = 401K<br>03 = Other | OC | 179 |
| NSCC Rejection Indicator | 81 | 81 | 1 | A/N | Input: Space<br>Output:<br>0 = Accepted by NSCC<br>1 = Rejected by NSCC<br>2 = Rejected by NSCC, multiple errors | R | |

FIG. 4C, Fund Order Entry Form

| NSCC Reject Code | 82 | 84 | 3 | A/N | Input : Space<br>Output: Reject code | R | |
| --- | --- | --- | --- | --- | --- | --- | --- |
| TPA Number (1) | 85 | 88 | 4 | A/N | Required if Originator Type = T or Membership Identifier = 02 | OC | 188 |
| Filler | 89 | 100 | 12 | A/N | Space | R | |

Fund/SERV — ORDER
Datatrak SYSID: 0125 = Firm
record 2 of 5 (required)

| Field Name | Start | End | Len | Type | Description | Opt/Req | Reject Code |
| --- | --- | --- | --- | --- | --- | --- | --- |
| Physical Sequence Number | 1 | 2 | 2 | A/N | | R | 004 |
| Logical Sequence Number | 3 | 4 | 2 | A/N | 02 | R | 004 |
| Filler | 5 | 7 | 3 | A/N | Space | R | |
| Share Quantity | 8 | 21 | 14 | N | 9,999,999,999.9999 Optional if full liquidation; Not allowed if Dollar Amount > 0. | RC | 019 |
| Customer Account Number at Firm | 22 | 41 | 20 | A/N | | R | 020 |
| Fund Account Indicator | 42 | 42 | 1 | A/N | 0 = New account - domestic<br>1 = New account - foreign<br>2 = Existing account - domestic<br>3 = Existing account - foreign | R | 010 |
| Customer Account Number at Fund | 43 | 62 | 20 | A/N | Required for all non-networked liquidations (Network Control Ind = 0 and Trans Code = 03 or 04) | OC | 011 |

FIG. 4D, Fund Order Entry Form

| | | | | | | | |
|---|---|---|---|---|---|---|---|
| IRA/DCP Indicator | 63 | 63 | 1 | A/N | 0 = Not applicable<br>1 = Current year payment<br>2 = Prior year payment<br>3 = IRA rollover<br>4 = Asset transfer<br>5 = Employee - prior year<br>6 = Employee - current year<br>7 = Employer - prior year<br>8 = Employer - current year<br>9 = Non-fund prototype IRA<br>A = Non-fund qualified plan<br>B = Defined contribution plan | R | 013 |
| Agent for Firm Number | 64 | 67 | 4 | A/N | | O | |
| Network Control Indicator | 68 | 68 | 1 | A/N | 0 = Non-networked<br>1 = Matrix level 1<br>2 = Matrix level 2<br>3 = Matrix level 3<br>4 = Matrix level 4 | R | 047 |
| Fraction Indicator | 69 | 69 | 1 | A/N | 0 = Round up<br>1 = Round down<br>2 = Issue fraction<br>3 = Not applicable | R | 014 |
| Gross Settlement Indicator | 70 | 70 | 1 | A/N | 0 = Not applicable<br>1 = Settle net<br>2 = Settle gross | R | 094 |
| Participant Processing Time | 71 | 76 | 6 | N | hhmmss<br>000000 (midnight) to 235959 | O | 168 |
| Membership Identifier | 77 | 78 | 2 | A/N | 01 = Trust member<br>02 = Networking info required for TPA | O | 181 |
| Filler | 79 | 100 | 22 | A/N | Space | R | |

FIG. 4E, Fund Order Entry Form

| Field Name | Start | End | Len | Type | Description | Opt/Req | Reject Code |
|---|---|---|---|---|---|---|---|
| Physical Sequence Number | 1 | 2 | 2 | A/N | | R | 004 |
| Logical Sequence Number | 3 | 4 | 2 | A/N | 03 | R | 004 |
| Filler | 5 | 7 | 3 | A/N | Space | R | |
| Dollar Amount (+) | 8 | 23 | 16 | N | 99,999,999,999,999.99 Optional for non Money Market trades if full liquidation; Not allowed for non Money Market trades if Share Quantity > 0. This amount will be settled by NSCC for Money Market purchase if no confirmation has been received | RC | 019 |
| Currency Indicator | 24 | 26 | 3 | A/N | Space. For future use | R | 110 |
| Anticipated Settlement Date (+) | 27 | 34 | 8 | A/N | mmddccyy Required if Settlement Override Reason Code is provided | OC | 180 |
| Branch Identification Number | 35 | 43 | 9 | A/N | | R | 035 |
| Related Trade Indicator | 44 | 44 | 1 | A/N | 0 = No 1 = Yes | R | 065 |
| Related Trade Identifier | 45 | 46 | 2 | A/N | Required if Related Trade Indicator = 1 | OC | 105 |
| Customer Name | 47 | 66 | 20 | A/N | | R | 063 |
| SSN/EIN Indicator | 67 | 67 | 1 | A/N | 0 = Tax ID number 1 = Social security number | R | 102 |
| SSN/EIN Number | 68 | 76 | 9 | A/N | | R | 103 |
| Liquidation Indicator | 77 | 77 | 1 | A/N | Required if Trans Type = 5. 1 = Gross 2 = Net 3 = No sales charge - other | OC | 046 |

FIG. 4F, Fund Order Entry Form

| | | | | | | | |
|---|---|---|---|---|---|---|---|
| | | | | | 4 = CDSC waiver due to correction<br>5 = Death<br>6 = Disability<br>7 = Mandatory distribution<br>8 = Systematic withdrawal | | |
| NAV Reason Code | 78 | 78 | 1 | A/N | Required if Trans Type = 3.<br>0 = Other<br>1 = Net asset value transfer<br>2 = Repurchase<br>3 = Employee<br>4 = Error correction<br>5 = Wrap fee account<br>7 = Commissionable defined contribution plan<br>8 = Non-commissionable defined contribution plan | OC | 104 |
| State of Sale | 79 | 80 | 2 | A/N | Required for new purchases | OC | 012 |
| Filler | 81 | 100 | 20 | A/N | Space | R | |

SYSTEM AND METHODS FOR PROCESSING OPEN-END MUTUAL FUND PURCHASE AND REDEMPTION ORDERS AT CENTRALIZED SECURITIES EXCHANGES

RELATED APPLICATIONS

This application claims priority from U.S. Provisional Application No. 60/166,558, filed Nov. 19, 1999, the disclosure of which is herein incorporated by reference.

FIELD OF THE INVENTION

This Application relates to a new process for the purchase (buying) and redemption (selling) (collectively, "trading processing") of shares of mutual funds (i.e., share of open-end investment companies), known in this application as Exchange (and Market) Listed Fund ("ELF") shares. More particularly, the application relates to placing orders for the purchase and redemption of the shares of any participating mutual fund, by any customer of any Member Firm of a Securities Exchange or Market Participant of a Securities Market, an Electronic Communications Network ("ECN") or the ELF market, for end of the day, or periodic, settlement at the fund's Net Asset Value ("NAV"), or clearing price.

BACKGROUND OF THE INVENTION

Currently, traditional actively managed mutual funds are not listed on Securities Exchanges, or Securities Markets, or "ECNs" (collectively, "Exchanges"), for intra-day, or end of day processing, because (1) Exchanges have traditionally been markets for the intra-day price discovery of their listed securities among their Member Firms or Market Participants ("Member Firms") and their Member Firms' customers; (2) listed securities have a finite number of shares which are brought and sold on an exchange; open end mutual funds continuously offer shares, for payment, via purchases, and continuously redeem shares, for payment; and (3) traditional mutual funds, whether 'load' or 'no-load' funds, are purchased or redeemed after the calculation of the fund's NAV, which is usually computed at the end of the day. NAV represents the total assets owned by the fund, less the total liabilities, divided by the number of shares outstanding. In practice, investors may invest in mutual funds by dollar amount (and may receive fractional shares) or number of shares. Share prices are calculated at end-of-day, on the basis of the NAV of the fund after the fund's daily securities transactions have been applied. A typical fund purchase or redemption transaction would take place after calculation of NAV. A customer might place an order for $1,000 of a fund with a $10.00 NAV per share, or order 100 shares of that fund at a cost of $1,000. The majority of fund shares, and monies due, are then cleared and settled through a Fund/Securities Clearing Agent (e.g., Fund/SERV and the National Securities Clearing Corporation ("NSCC")).

Although specific brokerage firms do provide their customers with daily purchase and redemption services for mutual fund shares through their fund supermarkets or proprietary fund distribution systems, there are various shortcomings with such services. Such firms generally allow only selected funds into their systems and offer either 'no-load' funds with 'no transaction fees' or 'transaction fees', or 'load' funds to their customers. Fund supermarkets that offer 'no transaction fee' funds to investors generally charge those mutual funds and/or their investment advisers/distributors annual asset-based fees of up to 40 basis points (e.g., 0.0040 bps×$1,000 of assets=$4.00 per year). Often all or a portion of these fees are deducted from a fund's NAV, resulting in a lower investment return for investors than might otherwise be the case. Fund supermarkets that offer 'transaction fee' funds generally charge investors higher fees to purchase or redeem 'no-load' mutual fund shares than to make regular stock trades. Sales 'loads' charged by brokers could cost investors a relatively significant percentage of their fund purchases.

SUMMARY OF THE INVENTION

It is the object of this invention to overcome some of the disadvantages of the prior art by creating a more open, uniform and efficient system for mutual fund distribution which is available to all investors and industry participants. The system and method allows any customer of any Member Firm of an Exchange or Brokerage Firm connected to the ELF market to place purchase or redemption order(s) for Exchange/ELF market listed mutual fund, shares, at any time such firm allows placing of such orders, via an Exchange/ELF market, for end-of-day, or intra-day, settlement at NAV, or clearing price.

It is another object of this invention to provide a system with universal connectivity among all investors and industry participants such that any investor may purchase or redeem any ELF share, through any Member Firm of which the investor is a customer or such Brokerage Firms connected to the ELF market, at any time such firm allows placing of such orders.

It is a further object of the invention to provide a system that provides the fund industry with a standard asset-based distribution and compensation system that may lower the annual fees charged to participating funds and/or their advisers/distributors and/or their investors by Member Firms, and that may lower investors' fund transaction fees to levels at or below their Member Firms' standard stock commissions.

There is thus the need for a system that increases mutual fund distribution among more investors and industry participants, reduces fund expenses and lowers distribution costs for funds, their investment advisors/distributors, and investors (thus increasing investor returns). The system is open to all funds that want to participate; all funds with assigned securities symbols (e.g., those 5 character symbols with suffix 'X' currently assigned to funds by the National Association of Securities Dealers Automated Quotation ("Nasdaq")), or other symbols assigned by other assignment entities (e.g., Exchanges/ELF market), representing such fund shares, are eligible to participate.

Thus in accordance with the invention there is provided a system for processing mutual fund order messages, including purchase and redemption transactions, comprising a server for receiving order messages from at least one of a plurality of designated Exchanges or Brokers, aggregating orders by fund, reformatting the order messages and transmitting the order messages to at least one of a plurality of Fund/Securities Clearing Agents for confirmation, clearing and settlement.

Moreover, there is provided a method for processing mutual fund order messages, including purchase and redemption transactions, comprising the steps of receiving order messages from at least one of a plurality of designated Exchanges or Brokers; aggregating orders by fund; reformatting the order messages; and transmitting the order messages to at least one of a plurality of Fund/Securities Clearing Agents for confirmation, clearing and settlement.

Further, in another embodiment of the invention there is provided a method for processing mutual fund order messages, including purchase and redemption transactions, comprising the steps of receiving order messages at an Exchange/ELF market from at least one Member Firm; matching and executing order messages; and transmitting the matched and executed order messages to at least one of a plurality of Member Firms for confirmation and to at least one of a plurality of Funds/Securities Clearing Agents for clearing and settlement.

BRIEF DESCRIPTION OF THE DRAWINGS

The accompanying drawings, which are incorporated in and constitute a part of the specifications, illustrate preferred embodiments of the invention and, together with the general description of the preferred embodiments given below, serve to explain the operation of the invention. It should be understood that the invention is not limited to the embodiments disclosed as examples, and is capable of variation within the scope of the appended claims. In the drawings.

FIG. 3 represents a prior art example of a standard Exchange Equity Order Entry Form(at).

FIGS. 4A-4F (collectively, FIG. 4) represent a prior art example of a Fund Order Entry Form (e.g., a Fund/SERV Order Form).

DETAILED DESCRIPTION OF THE DRAWINGS

Figure 1:
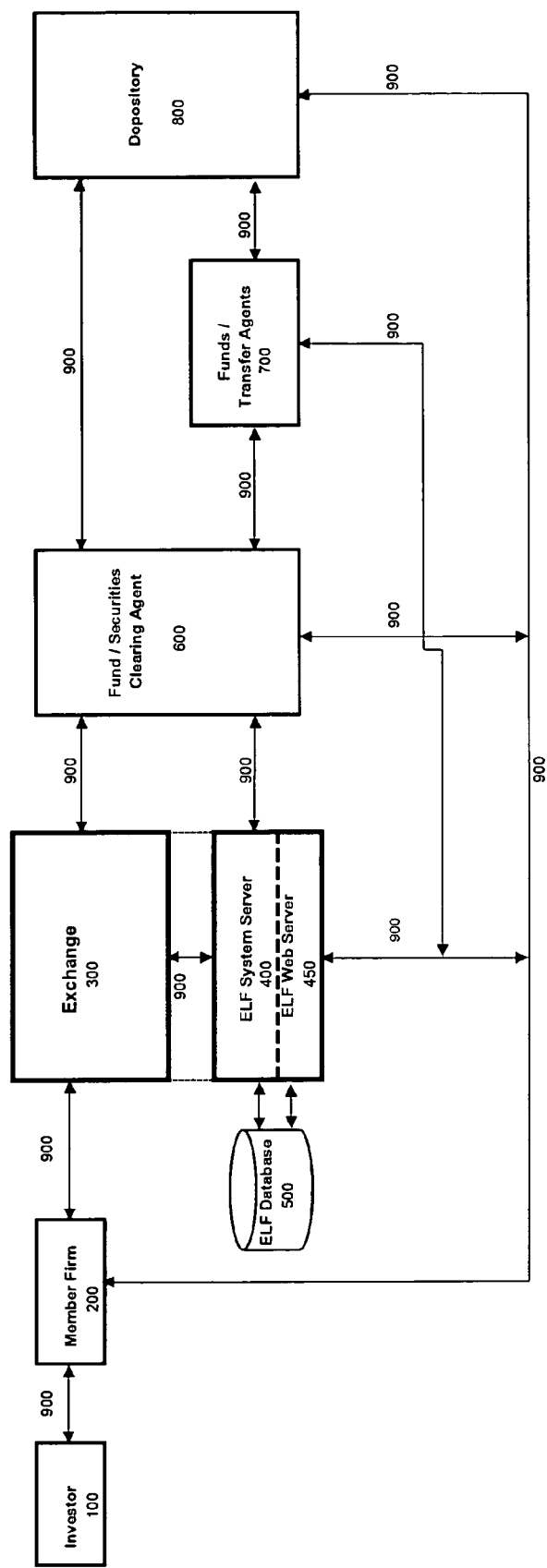
FIG. 1 represents a system for processing exchange listed fund purchase and redemption orders, in accordance with the invention.

Referring to FIG. 1, any Investor 100 using the system can place orders to purchase or redeem ELF shares through one or more Exchange(s) 300 via any registered broker of an Exchange Member Firm 200 or any broker connected to the ELF market. Moreover, all participating funds listed on the Exchange(s) and their fund (ELF) shares, are available for purchase or redemption by all Member Firms 200. Mutual funds already having designated securities symbols, or other assigned representative symbols, qualify such funds to be Exchange Listed Funds (ELFs). Investor 100 can purchase ELF shares of all participating funds through their Member Firms 200 as a securities trade, and pay a traditional commission (e.g., a stock commission) or other fees for broker services (e.g., asset based fees). Funds and their advisers/distributors may pay the Exchange and/or any other entity set up for this purpose a listing fee, an annual asset-based fee based on ELF share assets outstanding, and/or transaction fees. Further, an Investor 100 may pay a lower 'transaction' fee (e.g., a regular stock trade 'commission') per order to a Member Firm 200 for ELF share purchases and/or redemptions than they now pay in 'transaction fees' to purchase 'no load' funds or sales 'loads' to purchase 'load' funds.

With reference to FIG. 1, an Investor 100 wishing to purchase or redeem ELF shares communicates with a Member Firm 200 in any of a number of ways via a communications channel 900, including using a telephone, facsimile, personal computer over a Wide Area Network (WAN) such as the Internet, wireless or other type of input device, in person, etc. Communication channel(s) 900 may be any one of local area network (LAN), wide area network (WAN), wireless application protocol (WAP), dedicated lines, satellite or any other device or system for transmitting electronic data in a timely fashion. The communication channel(s) 900 is to and from, and among, Investors 100, Member Firms 200, the Exchange (s) 300, ELF System Server 400, the ELF Web Server 450, the Fund/Securities Clearing Agent 600, the Funds/Transfer Agents 700 and/or their Distributors (not shown), and the Depository 800.

Although one Investor 100, one Member Firm 200, one Exchange 300, one ELF System Server 400 one ELF Web Server 450, one ELF Database 500, one Fund/Securities Clearing Agent 600, one Funds/Transfer Agent 700 and one Depository 800 are shown, it is understood that any number of Investors, Member Firms, Exchanges, ELF Systems Servers, ELF Web Servers, ELF Databases 500, Fund/Securities Clearing Agents, Funds/Transfer Agents and Depositories may be embodied in accordance with the invention.

The Investor 100 device, although not illustrated in FIG. 1, further includes software such as an operating system necessary for operation of the computer system and various applications and hardware such as central processing unit and hard disks. The Investor 100 device still further includes hardware (not shown) such as a modem, a Local Area Network (LAN) adapter, etc., for executing a data communication with the Member Firm 200 computer system.

The Member Firm 200 uses a computer including a data entry device or electronic communications link with Investor 100 to ticket an ELF share order and create and log the Investor's 100 order into the Member Firm's 200 computer. The data entry device includes but is not limited to a keyboard, voice, bar code scanner, etc. Member Firm's 200 computer communicates with the Member Firm's 200 pre-existing customer and trading systems that comprises a database of customer and trade information. Member Firm's 200 computer includes interface systems and programs, not shown, that support communications with Investor 100, Exchange 300, ELF system Server 400, ELF Web Server 450, Fund/Securities Clearing Agent 600, Funds/Transfer Agents 700 and Depository 800 via communication channels 900, which may comprise separate channels between the various listed participants.

Member Firm's 200 pre-existing computer system electronically transmits ELF orders to the designated Exchange 300, via communication channel 900. The designated Exchange 300 forwards the ELF orders to the ELF System Server 400 via communication channel 900. The ELF System Server 400 stores trade related information on ELF Database 500, which may be accessed through connection to ELF Web Server 450. Although the ELF System Server 400 is shown as being located locally on the premises of an Exchange(s) 300, it may be located at a remote location(s), under the control of the Exchange(s) 300 and/or any other entity set up for this purpose.

The ELF System Server 400 receives order information from Member Firm 200 by Fund 700, type of order, and time of entry, etc. The ELF System Server 400 processes and transmits order information to the ELF Database 500, updates same, and allows access by ELF Web Server 450. Member Firm 200 and Funds 700 (and other ELF System Participants) may identify and follow their ELF orders through password protected inquiries, via the ELF Web Server 450. The ELF Web Server 450 may publish ELF market information such as ELF's NAV, intra-day trading volume, any NAV changes reported and other information in real-time, or summarized, over a network such as the Internet, for public access, in addition to password protected access by designated Participants. The Exchange 300 processing system also gives Member Firm 200 access to ELF order status via the customer services facilities currently employed by the Exchange(s) 300 for other Exchange 300 traded securities.

It is understood that an Exchange(s) may allow broker/dealers (not shown in FIG. 1) to act as intermediaries to be responsible for the capital commitment and legal and operational requirements which effect securities transactions (e.g., transactions in ELF shares as well as other securities).

The ELF System Server 400 may include several processors (not shown) coupled together. The ELF System Server 400 electronically aggregates orders reformats the ELF standard Exchange Equity Order Entry information (FIG. 3.) into the Fund Order Entry Format (see FIG. 4.), and transmits that order information to the Fund/Securities Clearing Agent 600, in real-time, single, batch, or multi-batch, throughout the day, or at the end of the day for execution, confirmation, and clearing, once or more per day, and settlement, at NAV, once or more daily. Moreover, the ELF System Server 400 and ELF Database 450, via ELF Web Server 450, provides Member Firms 200 with access to real-time, and/or summarized information related to submitted orders.

The Fund/Securities Clearing Agent 600 electronically forwards, individual, or netted/crossed/aggregated, ELF orders to individual Funds/Transfer Agents 700, via communication channel 900 for processing, confirmation, clearing and settlement, which includes fund issuance and redemption of shares by the mutual fund issuer.

Funds/Transfer Agents 700 transmit electronic payments of cash dividends and/or dividend reinvestment (consisting of income and/or capital gains and/or return of capital) payable by Funds 700, via communication channel 900 to the appropriate Member Firm's Fund/Securities Clearing Agent 600 account via the Fund/Securities Clearing Agent 600. Such dividend information may also be routed to the ELF System Server 400 by Funds/Transfer Agents 700, or by a fund NAV reporting agent (e.g., Nasdaq), for tabulation of ELF information, including, but not limited to correct calculation of each fund's NAV, calculation of ELF total returns and ELF assets held at each Member Firm 200.

An additional method for distributions of dividends is through Depository 800. In particular, ELFs may be designated Depository 800 Eligible Securities (e.g., currently designated by the Depository Trust Corporation). Alternatively, a bridge communications channel 900 link may be created between Depository 800 and the Fund/Securities Clearing Agent 700 so that dividends payable by Funds/Transfer Agents 700 are first paid to the Depository 800 and then transferred to the Fund/Securities Clearing Agent 600 for distribution to Member Firms 200 holding ELF shares.

Figure 2A:
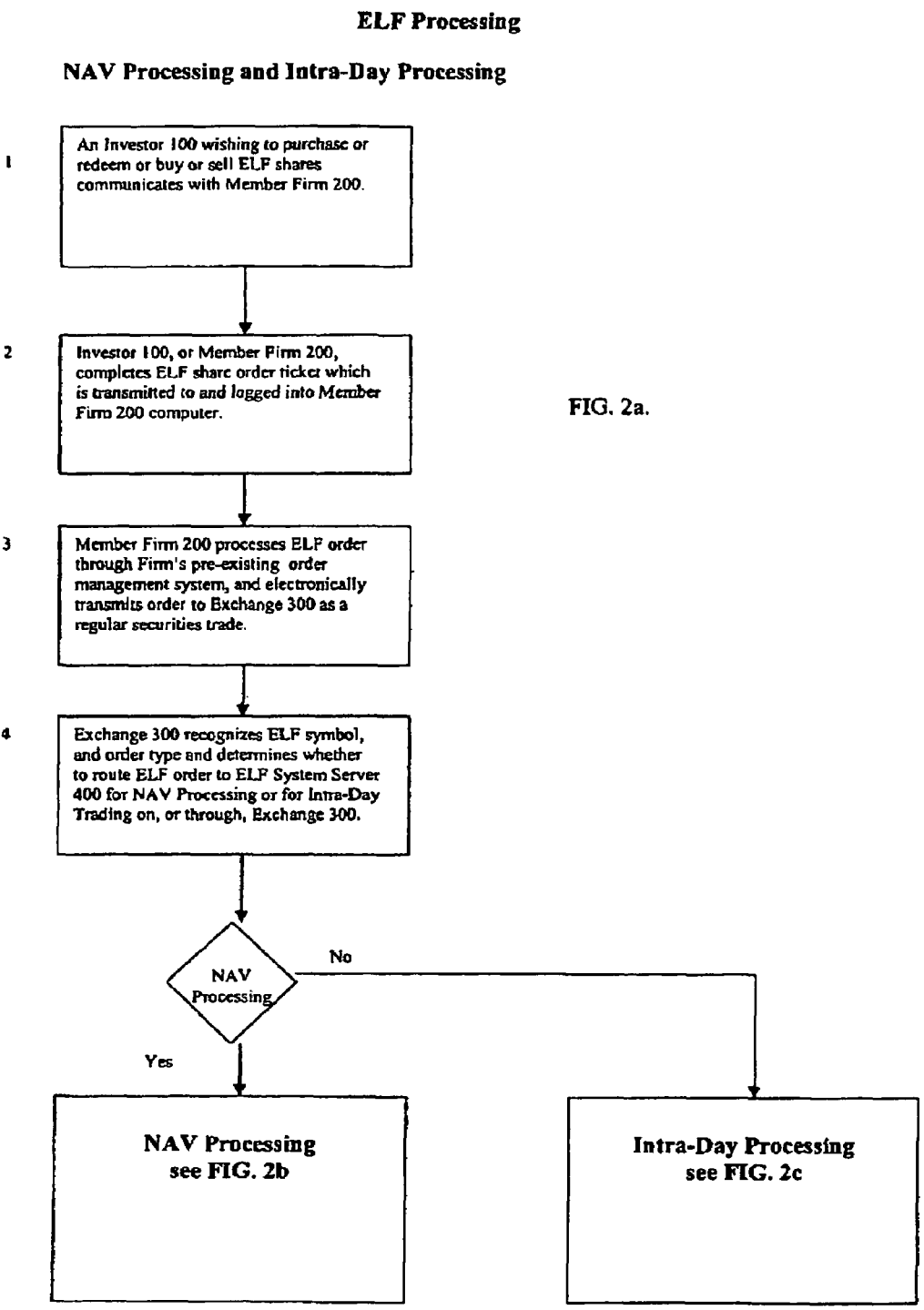
FIG. 2a represents methods for processing exchange listed fund purchase and redemption orders using the system of FIG. 1.
Figure 2B:
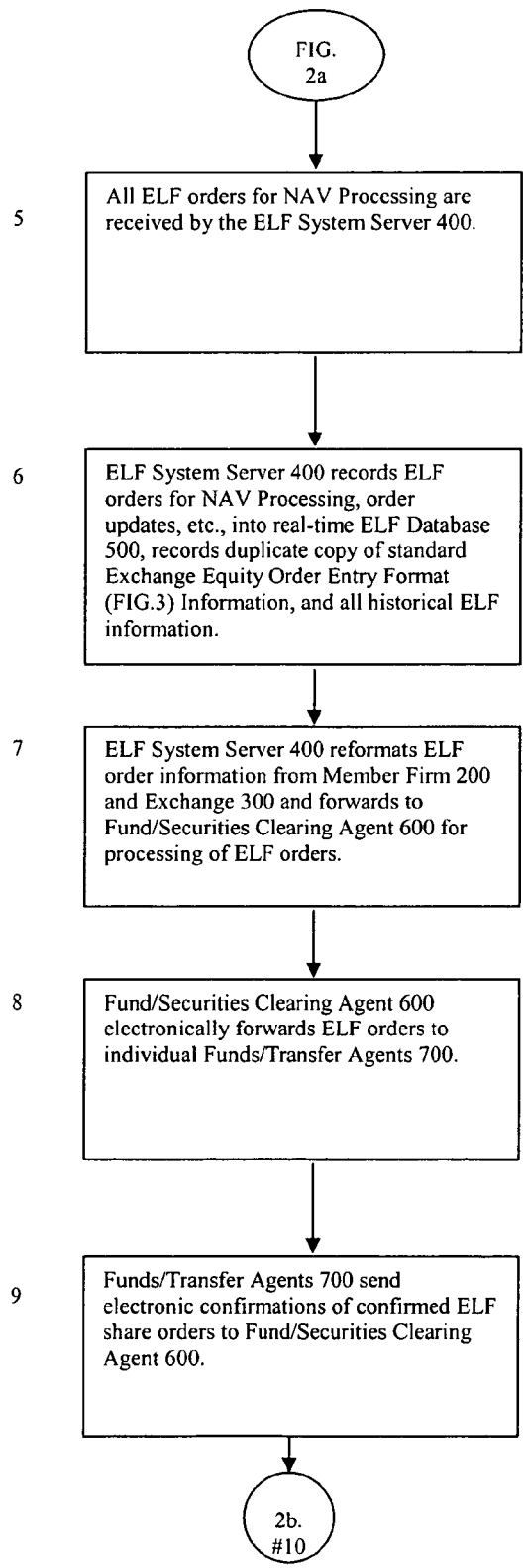
FIG. 2b represents method for NAV processing of exchange listed fund purchase and redemption orders using the system of FIG. 1.
Figure 2B:
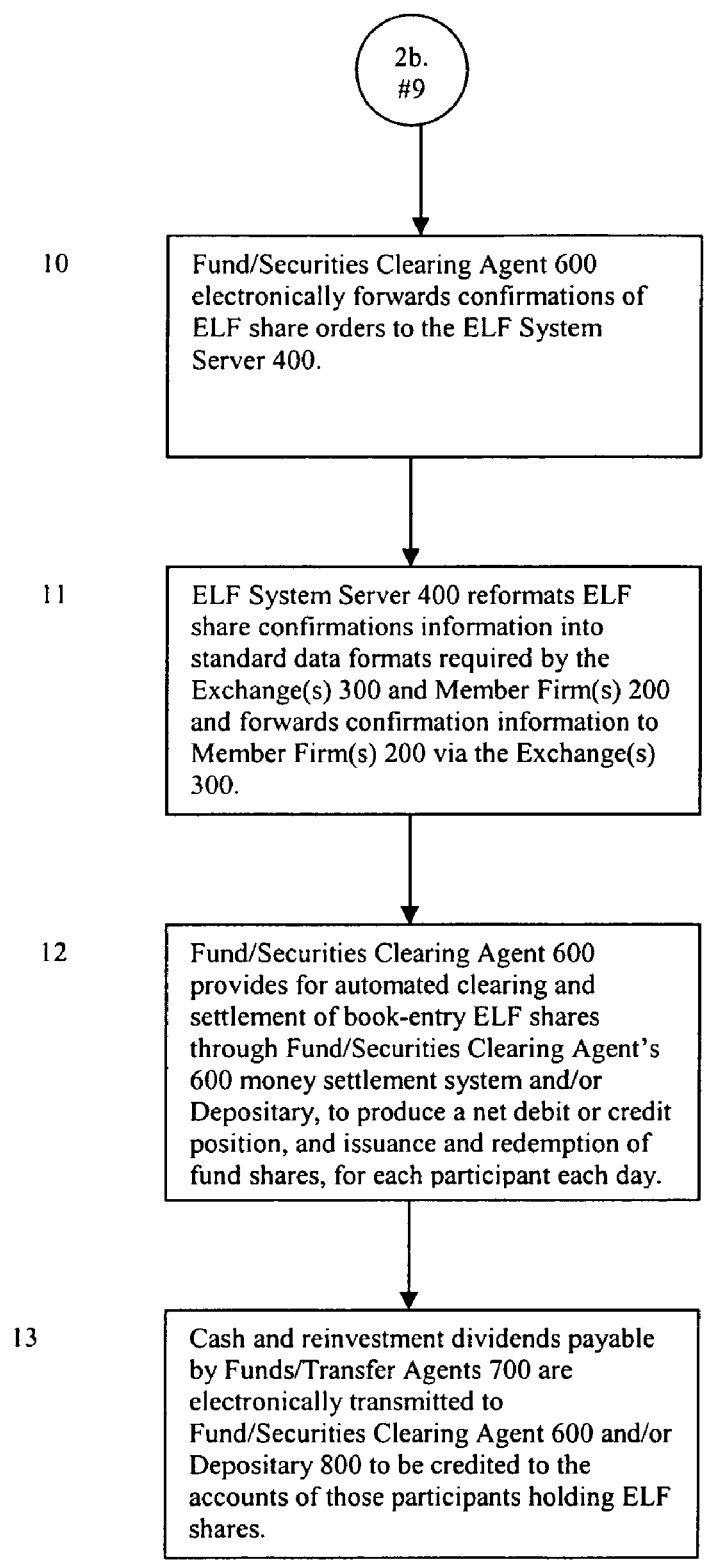
Figure 2C:
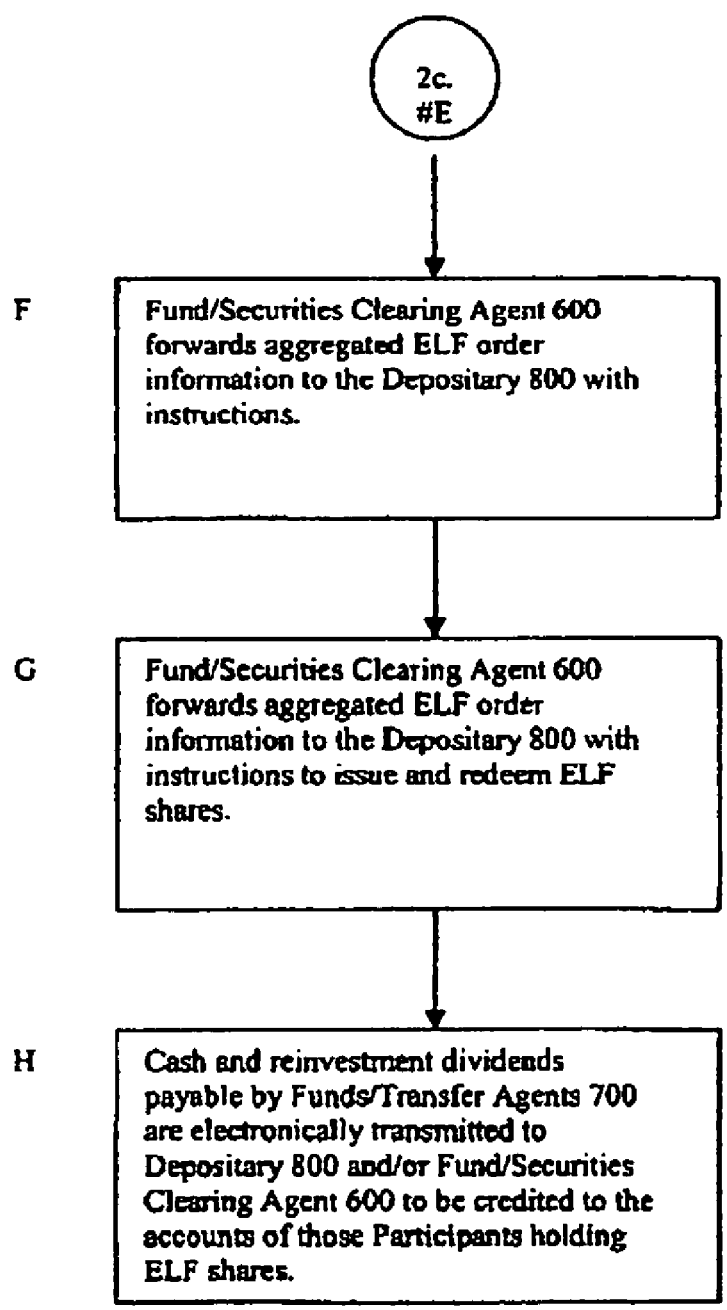
FIG. 2c represents method for Intra-Day trading of exchange listed fund purchase and redemption orders using the system of FIG. 1.

Referring to FIGS. 2*a*, 2*b*, and 2*c*, a description of the preferred embodiment for practicing the method of the invention using the system of FIG. 1 is shown. In particular, in the embodiment shown, ELF shares are purchased or redeemed (via Member Firm 200, Exchange 300, ELF System Server 400, Fund/Securities Clearing Agent 600) directly from the fund 700 after calculation of NAV, and may also be "processed" intra-day, similar to how stock, closed-end funds and Exchange traded funds (ETFs) are "traded" today. In this parallel, integrated system of NAV processing of ELF shares and intra-day trading of other securities, the ELF symbol is preferably a fund's currently assigned 5 character symbol, or is an assigned symbol (e.g., ELF Depository Receipts, each share representing beneficial ownership in a single share of a specific mutual fund).

With reference to FIG. 2*a*, in step 1, an Investor 100 wishing to purchase (buy) or redeem (sell) ELF shares communicates with the Member Firm 200 to place an order for a specified dollar or share amount of a specific fund.

In step 2, the Investor 100, or Member Firm 200, completes an ELF share order ticket, using a data entry device, or via electronic communications link, to create and input the Investor's 100 order into the Member Firm's 200 computer. The Investor 100 places the order as he or she would traditionally place orders for listed securities, e.g., specifying an ELF security symbol, currently five (5) characters ending with the suffix 'X', or another designated symbol, the number of shares (or dollar amount if supported by Member Firm 200 order entry system), limit price (if applicable), type of order (e.g. good until cancelled, good through the day of entry, opening only, immediate or cancelled, good until executed, etc.) and other information that may be requested or required by Member Firm 200 and Exchange 300.

In step 3, the Member Firm 200 uses the firm's pre-existing order management system to process the order. The Firm's pre-existing system formats the data of such order(s) according to the requirements of the then current communications facility and/or routing systems (e.g., currently the Securities Industry Automation Corporation (SIAC) for the New York Stock Exchange and the American Stock Exchange, or other such services as those used by Nasdaq or other Exchanges), which electronically link, and provide communications channels 900 and means by which the Member Firms 200 transmit and receive securities order information to and from the designated Exchange(s) 300 on which the ELF shares are listed and traded. A prior art example of a standard Exchange Equity Order Entry Format is shown in FIG. 3.

The Member Firm's 200 securities trading system then electronically transmits ELF share purchase or redemption orders, as regular securities trades with assigned symbols, via the communication channels 900 to the designated Exchange (s) 300, as they would a traditional securities order, or by such other means as are operationally efficient (e.g., if the Member Firm 200 had netting/crossing/aggregation capabilities (by fund), they might only transmit/route netted/crossed/aggregated orders to the designated Exchange 300).

In step 4, the designated Exchange's 300 order processing system would identify the transaction(s) as an ELF transaction(s) based on the ELF symbols (e.g. the current Nasdaq five (5) character symbol with an 'X' appended thereto, or by an ELF fund symbol look-up table), and determine whether to route such orders to the ELF NAV processing system, or to the ELF Intra-Day processing system. ELF orders for NAV processing are routed to the ELF System Server 400 (FIG. 2*b*) and ELF orders for Intra-Day processing which remain within the Exchange market for matching and execution (FIG. 2*c*) and, if applicable, later routed from Exchange 300 to ELF System Server 400 for NAV processing.

Referring to FIG. 2*b*, method of NAV processing using system in FIG. 1 is described.

In step 5 of FIG. 2*b*, ELF System Server 400 receives all ELF orders for NAV processing from the Exchange 300, periodically (if applicable), or at the end of the day.

In step 6, the ELF System Server 400 records ELF orders from Exchange 300 (step 5), and receives and records additional ELF purchase and redemption orders from Exchange 300 (FIG. 2*c*, step D) for end-of-day, or periodic (if applicable), NAV processing. The ELF System Server 400 processes any updates or actions against such related orders in the ELF Database 500. The ELF System Server 400 uses software to create a duplicate copy of the information received in the designated standard Exchange Equity Order Entry Format (FIG. 3). The ELF System Server 400 stores current, historical, and other information pertaining to, and totals of, ELF purchase and redemption orders by Member Firm 200 and by Fund 700, by date, including but not limited to gross purchase and redemption orders and net Fund positions, including dividends, of each Member Firm, in the ELF Database 500. The ELF System Server 400 uses applicable software programs to perform calculations, sorting and tabulation of records and creation of reports based upon data to be transmitted to, and/or received from, ELF Database 500 through communications interface with ELF System Server 400.

In step 7, the ELF System Server 400 reformats the ELF order information received from Member Firm 200 in standard Exchange Equity Order Entry Format into the data formats required by the Fund Order Entry Form (example in FIG. 4), and such reformatted order information is electronically forwarded to the Fund/Securities Clearing Agent 600 in real-time, single, batch, or multi-batch, throughout the day, or at the end of the day, through established electronic communication channel 900 to the Fund/Securities Clearing Agent 600 for execution, confirmation, clearing, and settlement, at NAV, which includes fund issuance and redemption of shares by the mutual fund issuer.

In step 8, the Fund/Securities Clearing Agent 600 electronically forwards, individual, or netted/crossed/aggregated, ELF orders to individual Funds/Transfer Agents 700 for processing and confirmation, which includes fund issuance and redemption of shares by the mutual fund issuer, along communication channel 900 established between the Fund/Securities Clearing Agents 600 and the Funds/Transfer Agents 700, in accordance with the Fund/Securities Clearing Agent's 600 policies and procedures.

In step 9, Funds/Transfer Agents 700 send electronic ELF share confirmations to the Fund/Securities Clearing Agent 600, along communication channel 900 established between the Funds/Transfer Agents 700 and the Fund/Securities Clearing Agent 600 in accordance with the Fund/Securities Clearing Agent's 600 policies and procedures.

In step 10, the Fund/Securities Clearing Agent 600 electronically sends confirmation of Member Firms' 200 ELF share orders back to the ELF System Server 400 periodically, and at the end of the day, according to the Fund/Securities Clearing Agent 600 policies and procedures. Such information travels along communication channel 900 established between the Fund/Securities Clearing Agent 600 and the ELF System Server 400.

In step 11, the ELF System Server 400 reformats the ELF share order confirmation information received from the Fund/Securities Clearing Agent 600 back into the standard data formats required by the Exchange 300 and Member Firm 200 communications protocols and electronically forwards such order confirmations to ordering Member Firm(s) 200 through the Exchange(s) 300, in real-time, or delayed, through communication channels 900 currently established for traditional securities trade confirmation purposes.

In step 12, the Fund/Securities Clearing Agent 600 provides for automated clearing and settlement of confirmed purchases and redemptions of book-entry ELF shares, which are registered in street name by the fund, for Fund/Securities Clearing Agent 700 and/or Depository 800 Participants; money settlement through the Fund/Securities Clearing Agent 600 (e.g., currently, NSCC's Daily Money Settlement System), in consolidation with other Fund/Securities Clearing Agent 700 Participant settlements to produce a net debit or credit position for each participant every business day, and corresponding ELF share issuance and redemption via Fund/Securities Clearing Agent 600 or Depository 700.

In steps 13, cash dividends and/or dividend reinvestment (consisting of income and/or capital gains and/or return of capital) payable by Funds 700 are remitted through electronic payments by the Funds/Transfer Agents 700 to the appropriate Member Firm's Fund/Securities Clearing Agent 800 and/or Depository 800 Participant accounts, such dividend information also being routed to the ELF System Server 400, or to be received from Fund NAV reporting agent (e.g., Nasdaq) for tabulation of ELF information, including, but not limited to correct calculation of each fund's NAV, calculation of ELF total returns and ELF assets held at each Member Firm 200.

Referring to FIG. 2c, method of Intra-Day Trading using system in FIG. 1 is described.

In step A of FIG. 2c, ELF orders for Intra-Day Trading may be matched and executed through an Exchange market maker or specialist, which would have both sides of a trade, either as a principal or representing another Member Firm 200.

In step B, once the trade is executed as a matched trade, the confirmation information is electronically reported to the Member Firm 200, in real-time, single batch or multi-batch through communication channel 900 currently established for such purposes.

In step C, matched and executed ELF trades are reported to the Fund/Securities Clearing Agent 600 by the Exchange 300, in real-time, or delayed, through communications channel 900 currently established for Exchange traded securities trade confirmation, clearing and settlement purposes and to ELF System Server 400 through communication channel 900.

In step D, at the end of the day, and/or periodically (if applicable), open ELF orders are forwarded to ELF System Server 400 by the Exchange 300 for NAV trading and processing (to step 5 of FIG. 2b).

In step E, all information regarding the executed ELF orders is tabulated and processed by the ELF System Server 400 and stored in ELF Database 500.

In step F, the Fund/Securities Clearing Agent 600 forwards matched ELF order information to the Depository 800 with instructions.

In step G, the Fund/Securities Clearing Agent 600 provides for automated clearing and settlement of confirmed purchases and redemptions of book-entry ELF shares, which are registered in street name by the fund for Fund/Securities Clearing Agent 600 and/or Depository 800 Participants (e.g., money settlement currently through NSCC's Continuous Net Settlement System (CNS) and NSCC's Daily Money Settlement System) in consolidation with other Fund/Securities Clearing Agent 600 settlements to produce a net debit or credit position for each Participant every business day, and corresponding ELF share issuance and redemption via Fund/Securities Clearing Agent 600 or Depository 800.

In step H, cash dividends and/or dividend reinvestment payable by Funds 700 (consisting of income and/or capital gains and/or return of capital) are remitted through electronic payments by the Fund/Transfer Agent 700 to the appropriate Member Firm's Fund/Securities Clearing Agent 600 and/or Depository 800 Participant accounts, such dividend information also being transmitted to the ELF System Server 400, or to be received from fund NAV calculation agent (e.g., Nasdaq) for tabulation of ELF information, including, but not limited to correct calculation of each fund's NAV, calculation of ELF total returns and ELF assets held at each Member Firm 200.

Having now described a few embodiments of the invention, it should be apparent to those skilled in the art that the foregoing is merely illustrative and not limiting, having been presented by way of example only. Numerous modifications and other embodiments, including combinations of features found in the illustrated embodiments, are within the scope of one of ordinary skill in the art and are contemplated as falling within the scope of the invention as defined by the claims.

What is claimed is:

1. A computer implemented method for processing open-end mutual fund order messages at a designated centralized securities Exchange, including purchase and redemption transactions of shares of an open-end mutual fund, the method comprising the steps of:
   receiving order messages associated with purchase or redemption of open-end mutual fund shares in Exchange Equity Order Entry Format at at least one of a plurality of first servers at the designated centralized Exchange, said open-end mutual fund being listed on the Securities Exchange as an Exchange listed open-end mutual fund (ELF), and having a total number of currently issued shares which is variable as a function of periodic adjustments for newly purchased shares and redeemed shares;
   aggregating the purchase and redemption orders of the open-end mutual fund by Member Firm;
   reformatting the order messages to Fund Order Entry Format at the at least one first server; and
   transmitting the reformatted order messages from the at least one first server to at least one of a plurality of second servers at Fund/Securities Clearing Agents for confirmation, clearing and settlement including issuance and redemption of the open-end mutual fund shares by the open-end mutual fund.

2. The computer implemented method of claim 1, wherein the step of transmitting further comprises the step of forwarding the reformatted order messages from the at least one first server to at least one third server of at least one individual Funds and Transfer Agents for processing and confirmation.

3. The computer implemented method of claim 2, wherein the step of forwarding comprises forwarding said reformatted order messages from the at least one first server, in single, batch and multi-batch, throughout the day.

4. The computer implemented method of claims 2 or 3, wherein the step of forwarding comprises forwarding said reformatted order messages from the at least one first server, in single, batch and multi-batch, at the end of the day.

5. The computer implemented method of claim 1, further comprising the step of receiving confirmation messages at the at least one first server from at least one of said second servers at the Funds/Securities Clearing Agents.

6. The computer implemented method of claim 5, wherein said confirmation messages are received at the at least one first server periodically and at the end of the day.

7. The computer implemented method of claim 5, further comprising the step of reformatting the confirmation messages at the at least one first server and transmitting said confirmation messages from the at least one first server to servers at least one of a plurality of ordering Member Firms.

8. The computer implemented method of claim 7, wherein the step of transmitting said confirmation messages further comprises the step of transmitting said confirmation messages from the at least one first server, in single, batch and multi-batch, throughout the day.

9. The computer implemented method of claims 7 or 8, wherein the step of transmitting said confirmation messages further comprises the step of delaying the transmission of said confirmation messages from the at least one first server, in single, batch and multi-batch, until the end of the day.

10. The computer implemented method of claim 1, further-comprising the step of clearing and settlement of order messages including the issuance and redemption of mutual fund shares by the mutual fund through the second servers at least one of said Fund/Securities Clearing Agents and fourth servers at least one of a plurality of Depositories using at least one Fund/Securities Clearing Agent money settlement system.

11. The computer implemented method of claim 1, further comprising the step of paying at least one of cash dividends and reinvested dividends to at least one of a Member Firm's Depository Account and a Fund/Securities Clearing Agent's Account.

12. The computer implemented method of claim 2, further comprising the step of receiving the order messages at the server for tabulation.

13. The computer implemented method of claim 12, further comprising the step of storing the order messages in a database.

14. The computer implemented method of claim 13, further comprising the step of storing information relating to said order messages in the database by dates, Member Firms and mutual funds, including gross purchase and redemption and historical orders, dividends, and net fund positions.

15. The computer implemented method of claim 13, further comprising the step of receiving dividend information at the at least one first server for tabulation of correct calculation of each fund's NAV, fund total returns over different time periods, and fund assets held at each Member Firm of each securities Exchange.

16. The computer implemented method of claim 15, further comprising the steps of storing NAV and total return information in the database including dividends and fund assets held at each Member Firm at different points in time.

17. The computer implemented method of claim 16, further comprising the steps of sorting orders, performing calculations relating to orders at the at least one first server including the steps of tabulating orders into records and generating reports.

18. A computer implemented method for processing open-end mutual fund order messages, including purchase and redemption transactions, comprising the steps of:
   receiving purchase and redemption order messages in Exchange Equity Order Entry Format at a first server of a centralized Exchange or Market Listed Fund from a second server of least one Member Firm;
   matching and executing the order messages for each open-end mutual fund by member firm at the first server of the Exchange or Market Listed Fund, each said open-end mutual fund being listed on the centralized Exchange or Market Listed Fund Market as Exchange or Market listed open-end mutual fund; and
   transmitting the matched and executed order messages from the first server of the Exchange or Market Listed Fund to servers at least one of a plurality of ordering Member Firms for confirmation;
   reformatting the matched and executed order messages to Fund Order Entry Format at the first server; and
   transmitting the reformatted order messages to servers at least one of a plurality of Funds/Securities Clearing Agents for clearing and settlement.

19. The computer implemented method of claim 18, wherein the steps of transmitting comprise the steps of forwarding said order messages and reformatted order messages from the first server, in single, batch and multi-batch, throughout the day.

20. The computer implemented method of claim 18, wherein the steps of transmitting comprise the steps of forwarding said order messages and reformatted order messages from the first server, in single, batch and multi-batch, at the end of the day.

21. The computer implemented method of claim 18, further comprising the step of transmitting the matched and executed order messages from the first server to a third server for tabulation and processing.

22. The computer implemented method of claim 21, further comprising the step of storing the matched and executed order messages in a database.

23. The computer implemented method of claim 22, further comprising the step of storing information relating to said matched and executed order messages by date, Member Firms and funds, including current period gross purchase and redemption and historical orders, dividends, and net fund positions in the database.

24. The computer implemented method of claim 23, further comprising the step of receiving dividend information at the third server for tabulation of correct calculation of each fund's NAV, fund total returns over different time periods, and fund assets held at each Member Firm of each Securities Exchange.

25. The computer implemented method of claim 24, further comprising the steps of storing NAV and total return information including dividends and fund assets held at each Member Firm at different points in time in the database.

26. The computer implemented method of claim 25, further comprising the steps of sorting orders, performing calculations relating to orders including tabulating orders into records and generating reports in the third sever.

27. The computer implemented method of claim 18, wherein the step of transmitting the matched and executed reformatted order messages from the first server to the servers of the Funds/Securities Clearing Agents further includes the step of transmitting matched and executed reformatted order messages from the first server to servers of at least one of a plurality of Depositories.

28. The computer implemented method of claim 27, further comprising the step of settlement of said matched and executed reformatted orders, including issuance and redemption of mutual fund shares by the mutual fund issuer, through servers at least one of the Fund/Securities Clearing Agents using at least one Fund/Securities Clearing Agent's continuous, daily and other money settlement system.

29. The computer implemented method of claim 28, further comprising the step of paying at least one of cash dividends and reinvested dividends to at least one of a Member Firm's Depository Account and a Fund/Securities Clearing Agent's Account.

30. A computer implemented system for processing open-end mutual fund order messages, including purchase and/or redemption orders, at a centralized Exchange comprising:
a first server at the centralized Exchange operable to: receive the purchase and/or redemption open-end mutual fund order messages in Exchange Equity Order Entry Format from one or more second servers at at least one Member Firm, said open-end mutual fund being listed as a security on the Exchange; aggregate the orders by fund and by each Member Firm; reformat the order messages to Fund Order Entry Format; and transmit the reformatted order messages to at least one third server at least one of a plurality of Fund/Securities Clearing Agents for confirmation, clearing and settlement.

31. The computer implemented system of claim 30, wherein the at least one third server at least one of the Fund/Clearing Agents forwards the reformatted order messages to at least one fourth server at at least one of individual Funds and Transfer Agents for processing and confirmation.

32. The computer implemented system of claim 30, wherein said first server transmits said order and reformatted messages, in single, batch and multi-batch throughout the day.

33. The computer implemented system of claim 30, wherein said first server transmits said order and reformatted messages, in single, batch and multi-batch, at the end of the day.

34. The computer implemented system of claim 30, wherein said first server receives confirmation messages from the at least one third server at least one of said Fund/Clearing Agents.

35. The computer implemented system of claim 34, wherein the confirmation messages are received at said first server periodically and at the end of the day.

36. The computer implemented system of claim 34, wherein the first server reformats the confirmation messages and transmits the confirmation messages to the one or more second servers at least one of a plurality of ordering Member Firms.

37. The computer implemented system of claim 36, wherein said first server transmits the confirmation messages to the one or more second servers at least one of the Member Firms, in single, batch and multi-batch, throughout the day.

38. The computer implemented system of claim 36, wherein said first server delays the transmission of said confirmation messages to the one or more second servers at at least one of the Member Firms, until the end of the day.

39. The computer implemented system of claim 30, wherein the at least one third server at at least one of said Fund/Securities Clearing Agents and at least one fifth server at one or more Depositories use at least one of said Fund/Securities Clearing Agent's money settlement systems to settle orders included in said reformatted order messages.

40. The computer implemented system of claim 30, wherein at least one of the Fund/Transfers Agents pays at least one of cash dividends and reinvested dividends to at least one of a Member Firm's Depository Account and a Fund/Securities Clearing Agent Account.

41. The computer implemented system of claim 30, wherein said first server tabulates said order messages.

42. The computer implemented system of claim 30, wherein the first server further comprises a database for storing said order messages.

43. The computer implemented system of claim 42, wherein said database stores information relating to said order messages by date, Member Firms and funds, including gross purchase and redemption and historical orders, dividends, and net fund positions.

44. The computer implemented system of claim 42, wherein said first server receives dividend information from the at least one third server at at least one of the Fund/Transfer Agents for tabulation of correct calculation of each fund's NAV, total returns over different time periods, and fund assets held at each Member Firm of each securities Exchange.

45. The computer implemented system, of claim 44, wherein said database stores NAV and total return information including dividends and fund assets held at each Member Firm at different points in time.

* * * * *

UNITED STATES PATENT AND TRADEMARK OFFICE
CERTIFICATE OF CORRECTION

PATENT NO. : 7,636,682 B1  Page 1 of 1
APPLICATION NO. : 09/716189
DATED : December 22, 2009
INVENTOR(S) : James MacPherson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1828 days.

Signed and Sealed this

Ninth Day of November, 2010

David J. Kappos
*Director of the United States Patent and Trademark Office*